(12) United States Patent
Partila et al.

(10) Patent No.: US 11,729,315 B2
(45) Date of Patent: *Aug. 15, 2023

(54) INTERACTIVE VOICE RESPONSE (IVR) FOR TEXT-BASED VIRTUAL ASSISTANCE

(71) Applicant: Bank of America Corporation, Charlotte, NC (US)

(72) Inventors: Juraj Partila, Belle Mead, NJ (US); Sergey Alexandrov, Somerset, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,037

(22) Filed: Aug. 23, 2021

(65) Prior Publication Data

US 2022/0046127 A1 Feb. 10, 2022

Related U.S. Application Data

(63) Continuation of application No. 16/986,785, filed on Aug. 6, 2020, now Pat. No. 11,153,438.

(51) Int. Cl.
*H04M 3/51* (2006.01)
*H04M 3/493* (2006.01)
*G06F 40/143* (2020.01)
*G06F 40/30* (2020.01)
*H04M 3/42* (2006.01)

(52) U.S. Cl.
CPC ........ *H04M 3/4938* (2013.01); *G06F 40/143* (2020.01); *G06F 40/30* (2020.01); *H04M 3/42382* (2013.01)

(58) Field of Classification Search
CPC ........... H04M 3/4938; H04M 3/42382; H04M 7/006; H04L 12/66; H04L 67/02; H04L 67/2823; G06F 40/143; G06F 40/30
USPC ....................................... 379/88.13
See application file for complete search history.

(56) References Cited

U.S. PATENT DOCUMENTS

| | | |
|---|---|---|
| 6,426,956 B1 | 7/2002 | Eteminan |
| 8,204,182 B2 | 6/2012 | Da Palma et al. |
| 8,874,447 B2 | 10/2014 | Da Palma et al. |
| 10,187,337 B2 | 1/2019 | Smullen et al. |
| 2008/0243517 A1 | 10/2008 | Muschett et al. |
| 2018/0255180 A1 | 9/2018 | Goldberg et al. |

OTHER PUBLICATIONS

Akshat Jain, "A brief introduction to Intent Classification"; website, https://towardsdatascience.com/a-brief-introduction-to-intent-classification-96fda6b1f557; 10 pages, Nov. 10, 2018; Towards Data Science.

(Continued)

*Primary Examiner* — Md S Elahee
(74) *Attorney, Agent, or Firm* — Banner & Witcoff, Ltd.

(57) ABSTRACT

Aspects of the disclosure relate to automated text-based customer query systems. A computing device associated with a text-based query system may receive, from a user communication device, a text input at the user communication device. The computing device may determine, based on the text input, a voice extensible markup language (VXML) application from a plurality of VXML applications. The computing device may determine, based on the VXML application, a text output, and send the text output for display at the user device.

20 Claims, 7 Drawing Sheets

(56) References Cited

OTHER PUBLICATIONS

"Building VoiceXML applications"; webpage; 6 pages; https://studio.tellme.com/vxml2/ovw/applications.html; downloaded Jul. 27, 2020.
"Intent Classification: How to Identify What Customers Want"; webpage; 16 pages; https://monkeylearn.com/blog/intent-classification/#:~:text=Intent%20classification%20is%20the%20automated,%2C%20Unsubscribe%2C%20and%20Demo%20Request. <https://monkeylearn.com/blog/intent-classification/; Monkey Learn; Oct. 22, 2019.

INTERACTIVE VOICE RESPONSE (IVR) FOR TEXT-BASED VIRTUAL ASSISTANCE

FIELD

Aspects described herein generally relate to automated remote customer assistance systems and more specifically to telephonic and text-based customer assistance systems.

BACKGROUND

Many organizations use automated telephonic customer assistance systems to receive and process consumer queries and provide customer service. A telephonic customer assistance system may be associated with one or more telephone numbers. A caller may dial a telephone number associated with the customer assistance system and follow a series of prompts to access various subsystems/applications, input a query, and/or receive a response to response to the query. The system may use interactive voice response (IVR) technology to receive caller inputs. For example, upon dialing the telephone number, a caller may be presented with a recording listing various available options and the caller may select an option by pressing an appropriate button on the number pad. Additionally, or alternatively, the system may use may use a voice input to select an option. Organizations often supplement a telephonic customer assistance system with a text-based customer assistance system. A text-based customer assistance system may receive a customer query in the form of a text (e.g., a short messaging service (SMS) message, an input via an application installed on a customer device, an input in a website, an email, etc.) and provide a response to the query.

SUMMARY

Aspects of the disclosure provide solutions that address and streamline operations of a text-based customer service system. In particular, one or more aspects of the disclosure relate to using applications associated with telephonic systems (e.g., applications associated with IVR technologies) for servicing text-based queries.

In accordance with one or more arrangements, a system having at least one processor, a communication interface, and memory may receive, from a user communication device via the communication interface, one or more first messages indicating a text input at the user communication device. The system may determine, based on the text input, a voice extensible markup language (VXML) application from a plurality of VXML applications. The system may determine, based on the VXML application, a text output. The system may send, to the user communication device via the communication interface, one or more second messages comprising the text output for display at the user device.

In some arrangements, the determining the text output may comprise executing, based on the text input, the VXML application to determine the text output.

In some arrangements, the executing the VXML application may comprise one or more of: sending, to the user communication device, a message requesting additional text input at the user communication device; sending, to the user communication device, the one or more second messages; retrieving, based on the text input, information from a system of records associated with the system; or sending, to the user communication device, one or more messages corresponding to retrieved information from a system of records.

In some arrangements, the system may determine, using a natural language understanding (NLU) component associated with the system and based on the text input, an intent associated with the text input, wherein the determining the VXML application is based on determining that the VXML application is mapped to the intent.

In some arrangements, the determining that the VXML application is mapped to the intent may comprise looking up an intent database to determine that the VXML application mapped to the intent, wherein the intent database comprises a plurality of intents mapped to the plurality of VXML applications.

In some arrangements, the determining the text output may comprises sending, to a VXML interpreter, an indication of the VXML application; and receiving, from the VXML interpreter, one or more third messages comprising the text output.

In some arrangements, the system may receive, from the user communication device, one or more third messages indicating a second text input at the user communication device. The system may determine, based on the text input, a non-VXML application corresponding to the second text input. The system may determine, based on the non-VXML application, a second text output. The system may send, to the user communication device, one or more fourth messages comprising the second text output for display at the user device.

In some arrangements, the determining the non-VXML application may be based on determining that no VXML application, from the plurality of VXML applications, corresponds to the second text input.

In some arrangements, the system may determine, using a natural language understanding (NLU) component associated with the system and based on the second text input, an intent associated with the second text input; wherein the determining the non-VXML application is based on determining that the non-VXML application is mapped to the intent.

In some arrangements, the determining the non-VXML application may be based on determining that no intent from an intent database, comprising intents corresponding to the plurality of VXML applications, is mapped to the intent.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
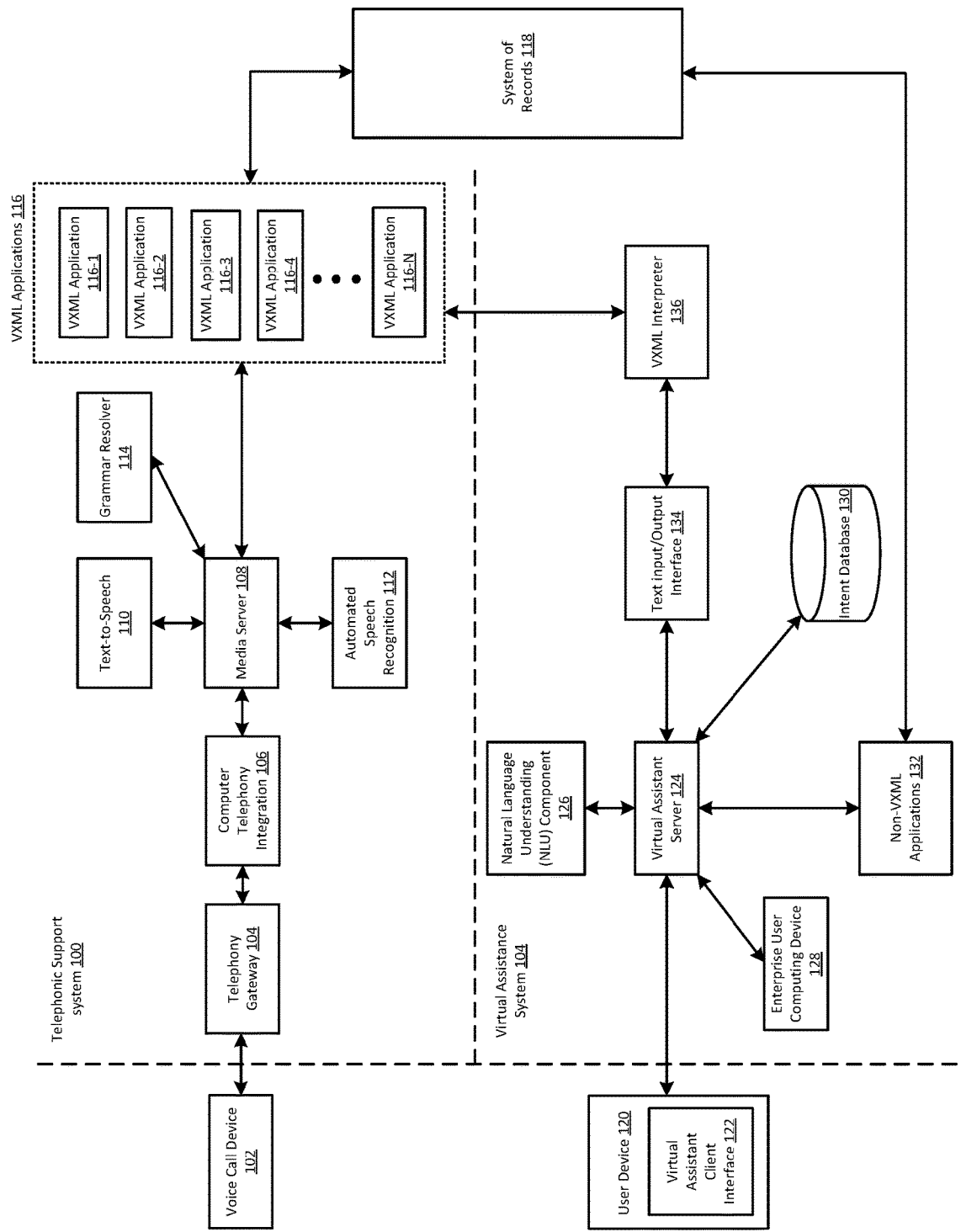
FIG. 1 shows an example architecture of a customer assistance system comprising a telephonic support system and a virtual assistance system corresponding to an enterprise organization, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Automated telephonic customer assistance systems are ubiquitously used by organizations for servicing client/customer requirements. A telephonic assistance system may comprise one or more applications (e.g., voice applications, such as voice extensible markup language (VXML) applications) that may receive caller inputs, perform appropriate actions, and/or provide appropriate responses based on caller input. In an arrangement, the telephonic assistance system may be an interactive voice response (IVR) system. A caller may interact with the IVR system via a keypad and/or via a voice input. For example, in an IVR assistance system associated with a bank, a client may input requests associated with checking an account balance, reviewing prior transactions, a query for bank locations, etc. A caller input via a keypad may be communicated to the IVR system via dual-tone multi-frequency (DTMF) signaling. Additionally, or alternatively, an IVR system may comprise a speech recognition module that may enable the system to process voice inputs.

Text-based assistance systems are growing in popularity due to widespread adoption of mobile devices, ease of use, and flexibility. A text-based assistance system is generally associated with an interface (e.g., associated with a website, a mobile application, etc.) that may be used to input a textual query. The text-based assistance system may receive the textual query, perform appropriate actions, and/or provide appropriate text responses. Many organizations operate both legacy IVR systems as well as text-based assistance systems. Implementing customer assistance functions for a text-based assistance system, where the functions are already implemented in a legacy IVR system, may require significant additional resources to essentially obtain a same customer assistance functionality for an end-user.

Various examples described herein provide a mechanism for using components of an IVR system to support operations of a text-based assistance system. A virtual assistant server, associated with a text-based assistance system, may receive, from a user communication device, a text input for a query. The virtual assistant server may determine, based on the text input, a VXML application from a plurality of VXML documents. The virtual assistant server may determine, based on the VXML application, a text output. The virtual assistant server may send, to the user communication device via the first communication interface, the text output. The user communication device may display, on a display device associated with the user communication device, the text output.

The virtual assistant server may comprise a natural language understanding (NLU) component that may determine (e.g., customer queries, requests for information) an intent associated with a text input. An intent adapter may determine a mapping between the determined intent and an intent that may be processed by a legacy IVR system to determine a VXML application (and/or a VXML document). This may enable an end user to flexibly interact with a text-based assistance system using natural language inputs while also obtaining useful information that may be facilitated by the legacy IVR system.

Further, interfacing an IVR system with a text-based assistance system may enable more efficient resource usage. Functionalities previously provided/implemented by legacy IVR systems may be reused for text-based assistance systems resulting in reduced implementation costs associated with a text-based assistance system. For example, an organization may simply use existing functionalities provided by the IVR system for text-based assistance systems as well, and need not design entirely new implementations for the text-based assistance system.

FIG. 1 shows an example architecture of a customer assistance system comprising a telephonic support system 100 and a virtual assistance system 104 corresponding to an enterprise organization, in accordance with one or more example arrangements. The enterprise organization may be a financial institution, a government or a private enterprise, a health institution, an educational institution, or the like. The telephonic support system may comprise one or more telephonic support components 102. The virtual assistance system may comprise one or more virtual assistance support components 104 for servicing textual queries.

The telephonic support system 100 may be configured to provide call-based customer assistance service to the user. The telephonic support system 100 may be accessed by a user dialing (e.g., using a voice call device 102) a telephone number associated with a telephonic customer service system of the enterprise organization. The voice call device 102 may be, for example, a mobile device, a smartphone, a landline telephone, etc. The call may be routed to a telephone gateway 104 via a public communication system (e.g., a landline system, a cellular system, a public switched telephone network (PSTN), etc.) using one or more communication protocols (e.g., wired or wireless communication protocols). The telephone gateway 104 enables the call to be received, via the public communication system, and processed by various components/modules associated with the telephonic support components 102. A computer telephone integration (CTI) module 106 may allow the incoming call to interface with internal computer networks associated with the organization. The CTI module 106 may provide data associated with the incoming call (e.g., telephone number associated with the voice call device 102, user identity information, etc.), as obtained from telephonic/cellular networks, to other modules/components among the telephonic support components 102.

A media server 108 may provide an interactive voice interface (e.g., a voice browser) for the user to access/interact with various voice applications (e.g., VXML applications 116), associated with the telephonic support system, during the call. Each VXML application of the VXML applications 116 may be associated with a corresponding customer assistance function and may comprise one or more VXML documents. For example, if the enterprise organization is a banking or a financial institution, a VXML application 116-1 may correspond to an application that enables the user to retrieve account information (e.g., account balance), the VXML application 116-2 may correspond to an application for servicing user credit card queries, the VXML application 116-3 may correspond to application for initiating money transfers, the VXML application 116-4 may correspond to an application for retrieving historical transaction data, etc. Each VXML application/document may be associated with corresponding dependencies which may include scripts, recorded audio, extensible markup language (XML) data, and/or additional VXML applications/documents. Each VXML application may be associated with a corresponding query that may be input by the user (e.g., via a voice input, or a keypad associated with the voice call device 102) to access a functionality provided by the application. For example, the VXML application 116-1 may be associated with the query "account balance," the VXML application 116-2 may be associated with the query "credit card," the VXML application 116-3 may be associated with the query "money transfer," and the VXML application 116-4 may be associated with the query "transaction history." While various examples described herein correspond to VXML applications/documents, the methods, devices, and systems described herein may be applicable for any application/document standard that specifies interactive media and voice dialogs between humans and computers.

The media server 108 may interface with/communicate with/comprise one or more additional modules/components that enable the user to navigate via the voice browser. The one or more modules/components may comprise an automated speech recognition (ASR) module 112, a grammar resolver 114, and/or a text-to-speech module 110. The ASR module 112 may be used to convert user call audio to text for processing by the media server 108. The grammar resolver 114 may parse the user input (e.g., the call audio that is converted to text) to determine the user query. The text to speech module may convert textual data obtained based on an execution of a VXML application to an audio for sending to the voice call device 102.

A VXML document in the VXML applications 116 may serve as an entry-point into the interactive voice interface. For example, in a customer assistance system associated with a banking institution, when a user places to a call to the telephonic customer service system, a VXML document may be accessed and executed by the media server 108. Based on the execution of the VXML document, the media server 108 may determine an audio to be played to the user in the call. The text-to-speech module 110 may determine the audio output based on a text provided by the execution of the VXML document. The audio may list out the various queries available for the user in a menu. For example, the various queries may correspond to checking an account balance, credit card information, initiating a money transfer to another client associated with the bank, etc.

The user may input a query using a voice input or by pressing an appropriate button on a keypad associated with the voice call device 102. For example, the user may say "check my account balance." The speech-to-text module 115 may convert the user voice input to a corresponding text output. The grammar resolver 114 may parse the converted text to determine that the user query corresponds to an "account balance" query that is associated with VXML application 116-1. Based on this determination, the media server 108 may fetch and execute VXML document(s) associated with the VXML application 116-1. The media server 108 may, based on the execution of the VXML document(s) may fetch data from one or more dependencies associated with the VXML application 116-1.

For example, a dependency associated with the VXML application 116-1 may be stored in a system of records 118. The system of records 118 may comprise information associated with clients of the enterprise organization. For example, the information may correspond to details associated with the clients (e.g., client identity, personal information, account details, communication preferences, account activity, subscribed services, etc.). The media server 108, based on the execution of the VXML application 116-1, may retrieve the user records from a system of records 118. Based on retrieval of the user records and the VXML application 116-1, the media browser 108 may provide an audio output (e.g., using the text-to-speech module 110) indicating an account balance as requested by the user.

The media server 108, based on an execution of a VXML application 116-1, may request additional user input via the voice call device 108. For example, execution of the VXML application 116-1 may result in the media server requesting the user (e.g., via a recorded audio) to input user credentials (e.g., account number) and/or perform additional selections within the VXML application 116-1. The user may input the user credentials (e.g., via voice). The media server 108 may receive the user credentials and use them for verifying user identity (e.g., using information stored in the system of records 118) prior to further execution of the VXML application 116-1.

User inputs may be provided to the media server 108 via DTMF signaling. For example, each query in the menu may be associated with a corresponding numeric input on a keypad associated with the voice call device 102. The user may input a query by selecting an appropriate button on the keypad. Each button on the keypad may be associated with a respective DTMF signal. For example, the query "account balance" may be associated with the input "1" and the user may access the functionalities of the VXML application 116-1 (associated with checking an account balance) by pressing "1" on the keypad. Based on user input via the keypad, the voice call device may send a DTMF signal associated with the input "1" to the media server 108. The media server 108 may determine that the input "1" associated with the query "account balance" was selected by the user. Based on this determination, the media server 108 may fetch and execute VXML document(s) associated with the VXML application 116-1.

Figure 2:
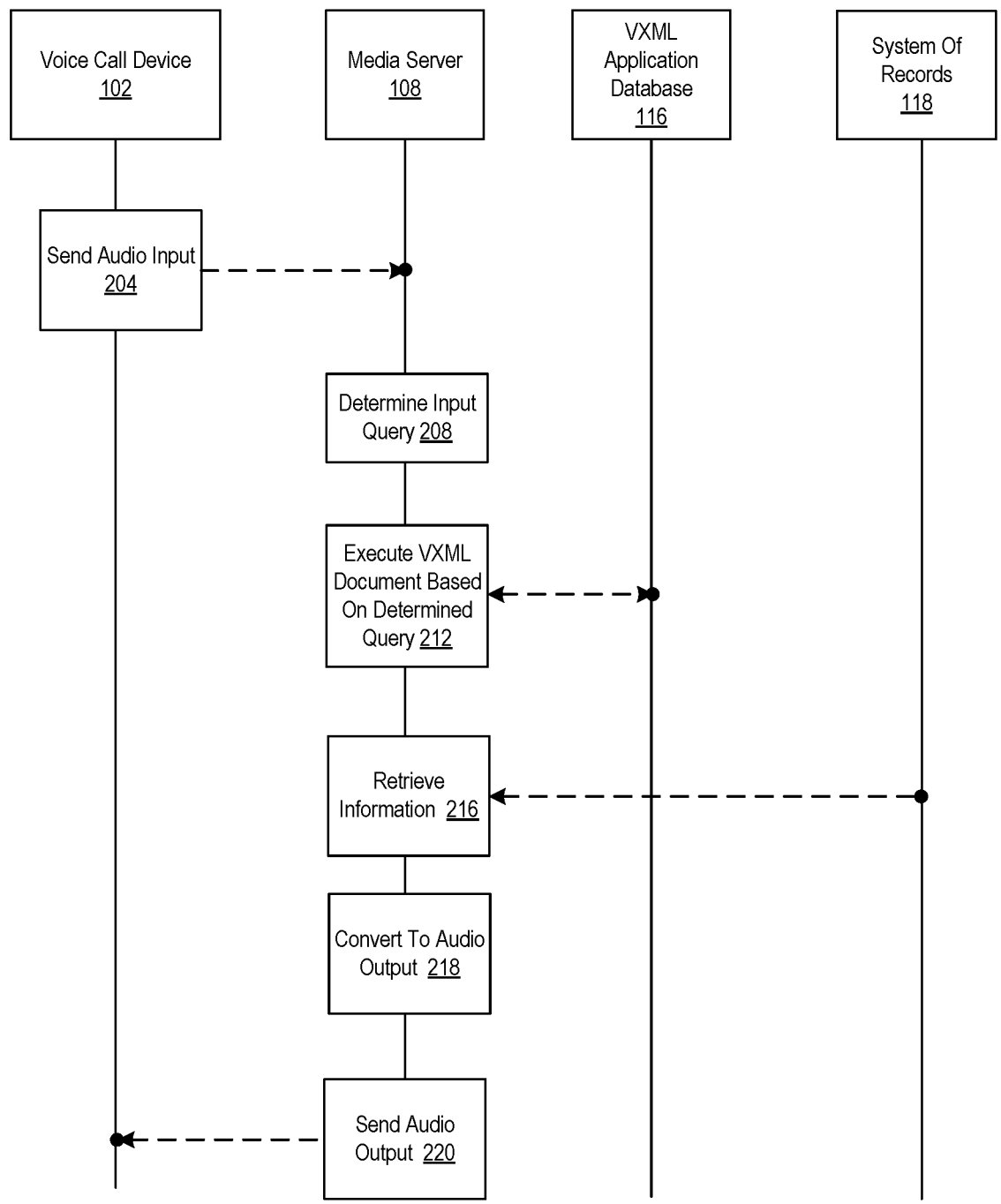
FIG. 2 shows an example event sequence for operation of a telephonic support system, in accordance with one or more example arrangements.

FIG. 2 shows an example event sequence 200 for operation of a telephonic support system 100, in accordance with one or more example arrangements. The example event sequence 200 may occur during an ongoing call between a user and the telephonic support system. At step 204, the voice call device 102 may send an audio input to the media server 108. The audio input may correspond to a user voice input or a DTMF signal corresponding to a user input at the voice call device 102.

At step 208, the media server 108 may determine an input query based on the received audio input. The media server 108 may use one or both of the ASR module 112 and the grammar resolver 114 to determine the input query based on the received audio input. At step 212, the media server 108 may determine to fetch and execute a VXML application, among the VXML applications 116, based on the input query.

For example, if the user query is for "account balance," the media server may fetch and execute the VXML application 116-1. Based on the execution of the VXML application 116-1, at step 216, the media server 108 may perform one or more steps to retrieve user account information (e.g., account balance information) from the system of records 118. Execution of the VXML application 116-1 and the retrieval of account information may comprise sending, by the media server 108 to the voice call device, an audio message requesting the user to provide authenticating information (e.g., account number, passcode, etc.).

At step 218, the media server 108 (e.g., the text-to-speech module 110 interfaced with the media server 108) may convert retrieved account information to an audio output. The audio output may comprise information based on the retrieval of account information from the system of record 118. If the user query is for "account balance," the audio output may comprise an audio message stating the user's account balance. The text-to-speech module 110 may convert account balance determined based on the retrieved user account information into speech that may be sent to the voice call device 102. At step 220, the media server 108 may send an audio output to the voice call device 102. One or more of the steps described with reference to FIG. 2 may be omitted or may be performed in a different order depending on an implementation of the telephonic support system 100.

Referring to FIG. 1, the virtual assistance system 104 may be accessed via a virtual assistant client interface 122 on a user device/appliance 120. The virtual assistant client interface 122 may be associated with an application corresponding to the enterprise organization as installed on the user device 120, an interface on a website accessible through a web browser on the user device 120, an interface associated with a smart appliance, etc. The virtual assistance system 104 may be configured to provide text-based customer assistance service to a user (e.g., via a chatbot).

The user may input a text query, via the virtual assistant client interface 122 on the user device 120. For example, the user may input the text query via a keypad/touchscreen associated with the user device or via a speech-to-text converter application installed on the user device 120. The user device 120 may send a message, comprising the text (e.g., via internet, any wired and/or wireless communication protocol), to a virtual assistant server 124. Since the user may input a text query using natural language and different users may use different phrases/styles to request a same customer assistance functionality, a natural language understanding (NLU) component 126 may be used to provide an interface between the user and the functionalities of the virtual assistance system 104. The NLU component 126 may determine an intent (e.g., category/class) associated with the text query. An intent may be associated with a specific purpose (e.g., checking account balance, initiating a money transfer, checking credit card information, etc.). The NLU component 126 may determine the intent based on an intent classification process via which the text query in analyzed or categorized to a particular purpose.

For example, the NLU component 126 may determine an intent that may be processed/serviced by the virtual assistance system 104 based on the natural language text query. The NLU component 126 may be configured to map a set of natural language text queries to a set of intents. The set of intents may map to various applications (e.g., VXML applications 116, other non-VXML applications) for providing user assistance. The NLU component 126 may comprise a machine learning component that may enable it to process user queries. The NLU component 126 may be configured to ask additional questions to the user, via the virtual assistant client interface 122, to determine an intent corresponding to the text query.

An intent database 130 may store indications of intents that may be processed/serviced by the VXML applications 116. For example, with reference to the example described above, the intent database 130 may store intents "account balance," "credit card," and "money transfer" that may be serviced by the VXML application 116-1, the VXML application 116-2, and the VXML application 116-3, respectively. Based on an intent determined by the NLU component 126 and information stored in the intent database 130, the virtual assistant server 124 may determine a VXML application, corresponding to the intent, to be executed/processed.

For example, the user may input, via the virtual assistant client interface 122, the text "How much money do I have in my account?" The NLU component 126 may determine, based on a user text input, an intent "account balance" associated with the user text input. The virtual assistant module 124 may determine, using the intent database 130, that the VXML application 116-1 corresponds to the intent "account balance." Based on this determination, the virtual assistant server may send the indication of the intent "account balance" or an indication of the VXML application 116-1 to a VXML interpreter 136.

Intents as may be determined by the NLU component 126 may be differently configured than intents associated with the VXML applications 116. The set of intents that may be determined by the NLU component 126 may different from the set of intents associated with the VXML applications 116. To enable the intents as determined by the NLU component 126 to be used for determining associated VXML applications 116, the intents as may be determined by the NLU component 126 may be mapped to intents stored in the intent database 130. In an arrangement, the virtual assistant server 124 may serve as/comprise an intent adapter that maps intents as determined by the NLU component 126 to intents stored in the intent database 130. Sending an indication of an intent to the VXML interpreter 136 may comprise sending an indication of an intent, in the intent database 130, that may be mapped to an intent as determined by the NLU component 126.

Not all intents as determined by the NLU component 126 may be mapped to intents stored in the intent database 130 or be associated with a VXML application in the VXML applications 116. The virtual assistant server 124 may execute a non-VXML application based on determining that that an intent (as determined by the NLU component 126) does not map to an intent stored in the intent database 130 or is not associated with a VXML application among the VXML applications 116. For example, the NLU component 126 may determine, based on the user text input, an intent corresponding to "update online banking credentials." The virtual assistant server 124 may determine that the intent corresponding to "update online banking credentials" is not associated with any VXML application among the VXML applications 116. Based on this determination, the virtual assistant server may fetch and execute a non-VXML application (e.g., among non-VXML applications 132). The non-VXML applications may be associated with intent "update online banking credentials." Fetching and executing a non-VXML application from the non-VXML applications 132 may comprise using representational state transfer (REST) application programming interfaces (APIs), simple object access protocol (SOAP) web services, message queues, and/or database interfaces to interface with the system of records 118.

The VXML interpreter 136 may be similar to the media server 108 but may not comprise a text-to-speech module, an automated speech recognition module, and/or a grammar resolver module. In an example, the media server 108 may function as the VXML interpreter 136.

The virtual assistant server 124 and the VXML interpreter 136 may communicate via one or more channels. A text channel (using a text input/output interface 134) may be used to provide user text input to the VXML interpreter 136, and provide text output, based on an execution of a VXML application, to the virtual assistant server 124. DTMF emulation may be used to select a particular VXML application among the plurality of VXML application 116. For example, based on determination of an intent by the virtual assistant server 124 (e.g., using the NLU component 126 and/or the intent database 130), the virtual assistant server 124 may send an indication of the intent (or a VXML application associated with the intent) in the form of a DTMF signal to the VXML interpreter 136. The VXML interpreter 136 may select the VXML application, among the plurality of VXML applications 116, based on the DTMF signaling. The virtual assistant server 124 may provide CTI/telephony headers (e.g., indicating a number associated with a cellphone/the user device 120) to the VXML interpreter 136. Using DTMF signaling for sending an indication of the intent and/or the CTI/telephone headers may also allow the media server 108 to be used for performing the functions of the VXML interpreter 134.

The VXML interpreter 136 may fetch and execute a VXML application associated with the intent as indicated by the virtual assistant server 124. Fetching and executing a VXML application may comprise fetching and executing one or more VXML documents corresponding to the VXML application. For example, the VXML interpreter 136 may, based on the execution of the VXML application, may fetch data from one or more dependencies associated with the VXML application. The VXML interpreter 136 may perform one or more additional operations as described above with reference to the media server 108. The VXML interpreter 136 may fetch user records from the system of records 118 based on the execution of the VXML application to service a user request. The VXML interpreter 136 may send, via the virtual assistant server 124, messages requesting additional user input (e.g., user credentials) via the virtual assistant client interface 122. An output determined by the VXML interpreter 136 based on an execution of the VXML application may be sent, via the text input/output interface 134, to the virtual assistant server 124. The virtual assistant server 124 may send a text output, to the user device 120 (e.g., for display on the virtual assistant client interface 122) based on the output determined by the VXML interpreter 136.

In an arrangement, the NLU component 124 and/or the virtual assistant server 124 may be unable to determine, based on the input text query, an intent associated with the VXML applications 116 and/or the non-VXML applications 132. The virtual assistant server 124 may send a notification to an enterprise user computing device 128 based on this determination. The enterprise user computing device 128 may be associated with an enterprise user corresponding to the organization (e.g., a customer-service specialist) who may be able to assist the user.

Figure 3A:
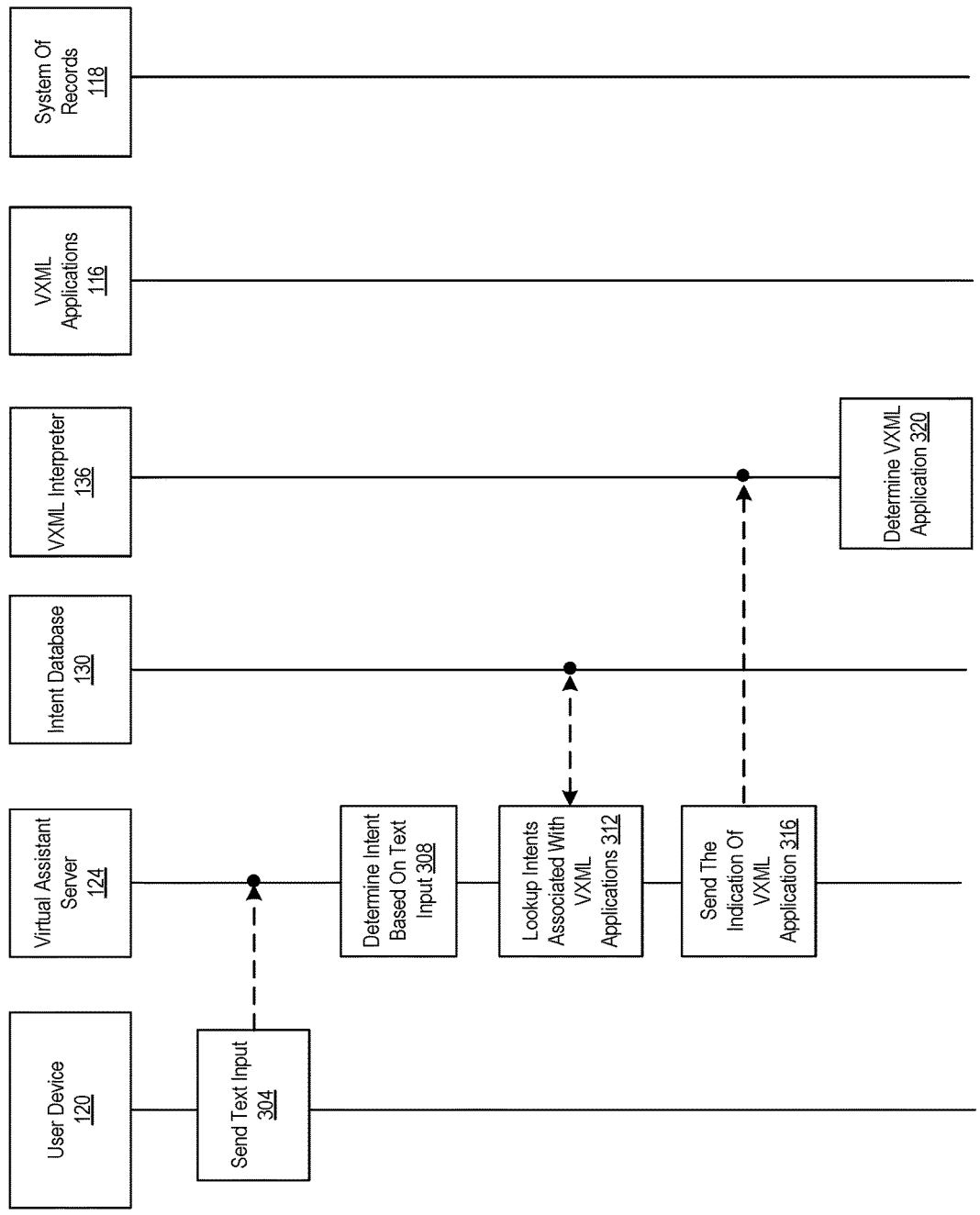
FIGS. 3A and 3B show an example event sequence for operation of a virtual assistance system, in accordance with one or more example arrangements.
Figure 3B:
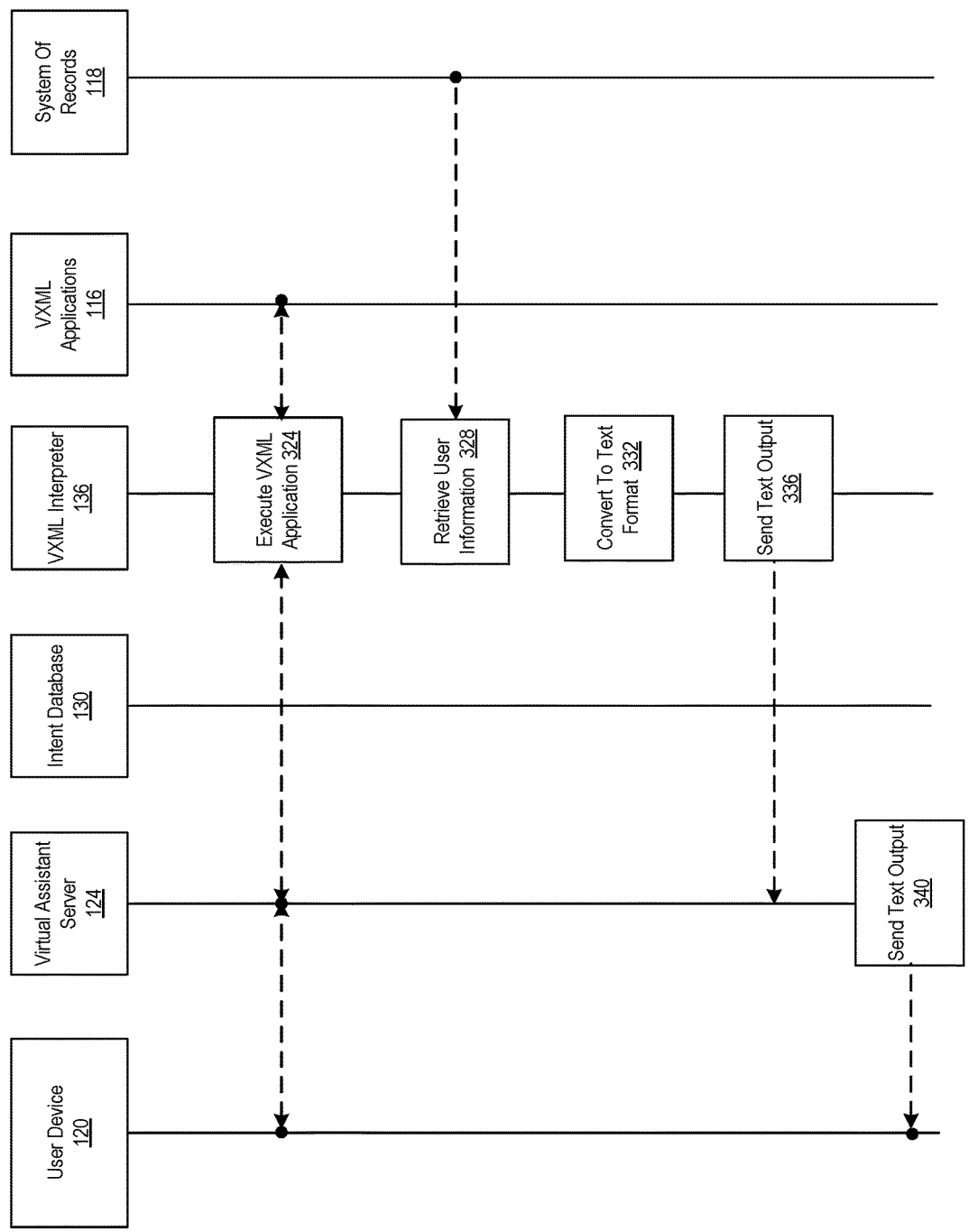

FIGS. 3A and 3B show an example event sequence 300 for operation of a virtual assistance system, in accordance with one or more example arrangements. At step 304, the user device 120 may send, to the virtual assistant server 124, one or more messages indicating a text query as entered by a user (e.g., via the virtual assistant client interface 122).

At step 308, the virtual assistant server 124 may determine an intent associated with the text query. The virtual assistant server 124 may use the NLU component 126 to determine the intent associated with the text query. At step 312, the virtual assistant server 124 may lookup the intent database 130 to determine if the determined intent is stored in the intent database 130. Lookup of the intent database 130 may comprise using an intent adapter to map the determined intent to an intent that may be stored in the intent database 130. Based on determining that the determined intent is stored in the intent database 130, the virtual assistant server 124 may determine a VXML application (among the VXML applications 116) that is mapped to the determined intent.

At step 316, the virtual assistant server 124 may send an indication of the determined VXML application to the VXML interpreter 136. The indication may be in the form an emulated DTMF tone that maps to the VXML application, or may be in any other indication. For example, if the NLU component 126 determines, based on the text query, an intent "transaction history," the virtual assistance server 124 may send a DTMF signal corresponding to a VXML application associated with providing a user transaction history (e.g., the VXML application 116-4). The virtual assistant server 124 may further send CTI-related information associated with user device (e.g., telephone/cellular number associated with the user device 120, user identity information, etc.). The CTI-related information may be used by the VXML interpreter 136, for example, for determining a user identity associated with the user.

At step 320, the VXML interpreter 320 may determine the VXML application (among the VXML applications 116) based on the indication from the virtual assistant server 124. At step 324, the VXML interpreter 136 may execute the VXML application. Executing the VXML application may comprise one or more: requesting additional user input via the virtual assistant client interface 122, sending one or more messages corresponding to a text output for display at the virtual assistant client interface 122, retrieving information from the system of records 118, sending one or more messages indicating retrieved information for display as a text output at the virtual assistant client interface 122, etc.

For example, executing the VXML application at the VXML interpreter 136 may comprise requesting and/or receiving additional text input from the user device 120. The VXML interpreter 136, based on the execution of the VXML application, may provide the user with a menu indicating a plurality of functionalities provided by the VXML application. Providing the user with the menu may comprise sending, to the user device 120 via the virtual assistant server 124, a message indicating the plurality of functionalities. The user device 102 may display the plurality of functionalities (e.g., in the virtual assistant client interface 122) as a text output. The user may provide a text input, via the virtual assistant client interface 122, selecting a particular functionality among the plurality of functionalities. The indication of the selected functionality may be sent to the virtual assistant server 124 and/or the VXML interpreter 136 for further processing.

For example, the VXML application may correspond to an application for accessing historical transaction data in the user's bank account. Based on the execution of the VXML application, the VXML interpreter 136 may provide (e.g., through the virtual assistant server 124) a plurality of options corresponding to a requested period of time. For example, execution of the VXML application may result in the VXML interpreter 136 providing a menu to the user device 120 (e.g., as displayed on the virtual assistant client interface 122) with entries listing one week, one month, 3 months, 6 months, 1 year, etc. The menu may be displayed in the form of text at the virtual assistant client interface 122, and the user may input a selection using the virtual assistant client interface 122. An indication of the selection may be sent to the VXML interpreter 136 for processing.

Steps 328-340 correspond to an exemplary procedure for retrieving information from the system of records 118 and displaying the information as a text output at the user device 120 based on execution of a VXML application. At step 328, the VXML interpreter 136, based on the execution of the VXML application, may retrieve information from the system of records 118. For example, if the VXML application, as indicated by the virtual assistant server 124 at step 316, corresponds to an application for accessing historical transaction data, the VXML interpreter 136 may retrieve the user's historical transaction data from the system of records 118. The VXML interpreter 136 may retrieve the user's historical transaction data from the system of records 118, for example, based on the selection by the user.

At step 332, the VXML interpreter 136 may convert the retrieved information to a text format. At step 336, the VXML interpreter 136 may send the retrieved information to the virtual assistant server 124 (e.g. via the text channel). At step 340, the virtual assistant server 124 may send, to the user device 120, the retrieved information. Sending the retrieved information to the user device 120 may comprise sending one or more messages indicating a text output for display at the user device 120 (e.g., the virtual assistant client interface 122). The user device 120 may display the retrieved information (e.g., in the virtual assistant client interface 122). One or more of the steps described with reference to FIGS. 3A and 3B may be omitted or may be performed in a different order depending on an implementation of the virtual assistance system 104.

Figure 4A:
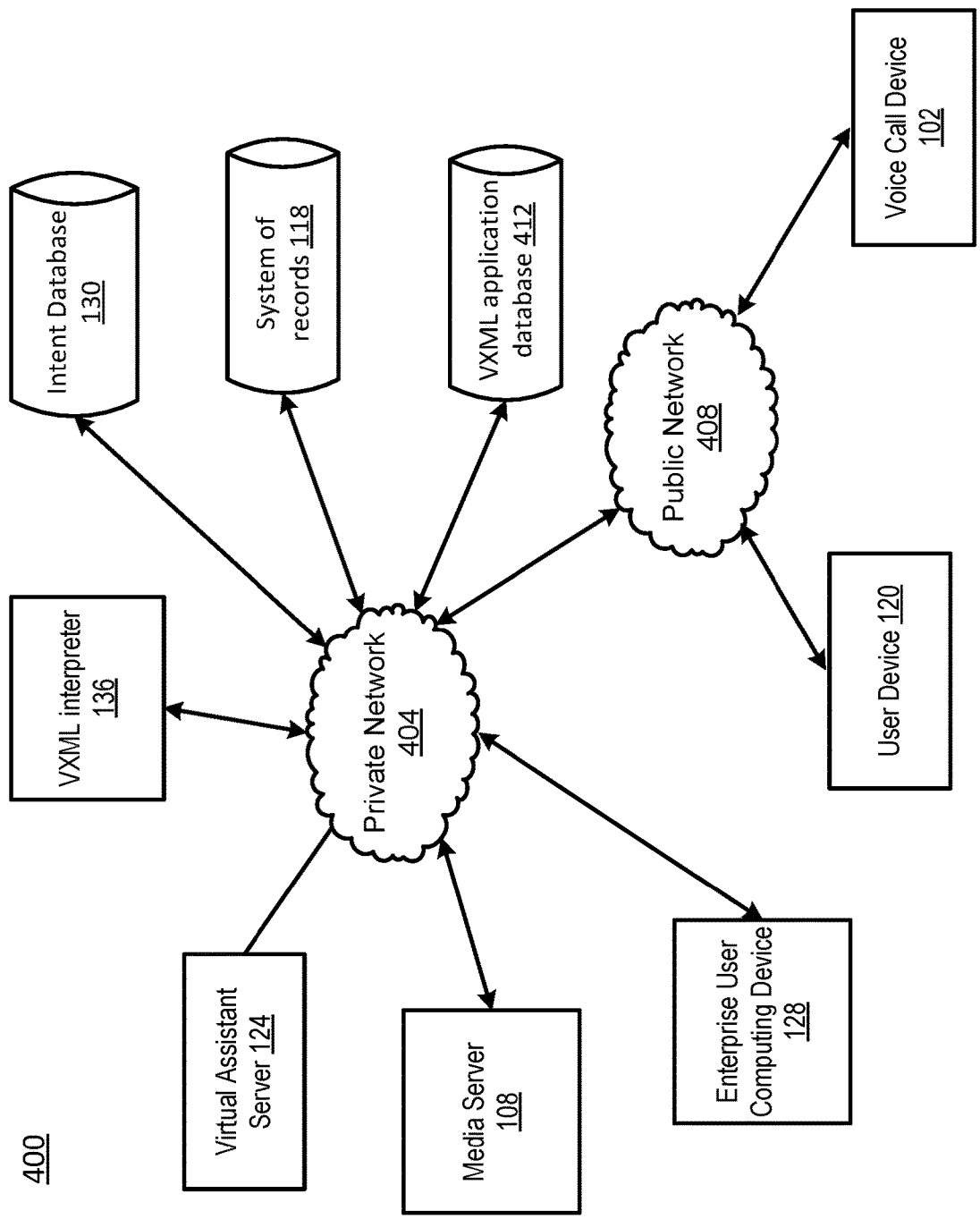
FIG. 4A shows an example computing environment for customer assistance system, in accordance with one or more arrangements.

FIG. 4A shows an example computing environment 400 for a customer assistance system, in accordance with one or more arrangements. The computing environment 400 may comprise one or more devices (e.g., computer systems, communication devices, etc.). The computing environment 400 may comprise, for example, the media server 108, the virtual assistant server 124, the VXML interpreter 136, the enterprise user computing device 128, and one or more databases (e.g., the intent database 130, the system of records 118, the VXML application database 412). The one or more of the devices and/or systems, may be linked over the private network 404 associated with the enterprise organization. The computing environment 400 may additionally comprise the user device 120 and the voice call device 102 connected, via a public network 408, to the devices in the private network 404. The devices in the computing environment 400 may be transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The enterprise user computing device 128 may be a computing device (e.g., desktop computer, laptop computer) or mobile computing device (e.g., smartphone, tablet). The front-end notification unit 102 may be linked to and/or operated by an enterprise user of the enterprise organization. The enterprise user computing device 128 may receive data from the virtual assistant server 124, the user device 120, the system of records 118, and/or other devices in the computing environment, manipulate and/or otherwise process such data, and/or return processed data to the virtual assistant server 124 and/or the user device 120. The enterprise user computing device 128 may be configured to service user requests that are unable to be processed by the virtual assistant server.

The virtual assistant server 124 may comprise one or more computing devices and/or other computer components (e.g., processors, memories, communication interfaces). As illustrated in greater detail below, the virtual assistant server 124 may be configured to host, execute, and/or otherwise provide one or more enterprise applications to service the virtual assistant client interface 122 on the user device 120. Additionally, the virtual assistant server 124 may receive data from VXML interpreter 136, manipulate and/or otherwise process such data, and/or return processed data and/or other data to the user device 120 and/or to other devices in the computing environment 400.

The VXML interpreter 136 may comprise one or more computing devices and/or other computer components (e.g., processors, memories, communication interfaces). The VXML interpreter 136 may be configured to host, execute, and/or otherwise provide one or more enterprise applications to process the VXML applications 116. Additionally, the VXML interpreter 136 may call and execute VXML applications 116, receive data from the user device 120 (e.g., via the virtual assistant server 124) and/or the system of records 118, manipulate and/or otherwise process such data, and/or return processed data and/or other data to the user device 120 (e.g., via the virtual assistant server 124) and/or to other devices in the computing environment 400.

The media server 108 may comprise one or more computing devices and/or other computer components (e.g., processors, memories, communication interfaces). The media server 108 may be configured to host, execute, and/or otherwise provide one or more enterprise applications to service the telephonic support system 100. Additionally, the media server 108 may call and execute VXML applications 116, receive data from the voice call device 102 and/or the system of records 118, manipulate and/or otherwise process such data, and/or return processed data and/or other data to the voice call device 102 and/or to other devices in the computing environment 400. In an example, the media server may perform one or more functionalities of the VXML interpreter as described above.

The user device 120 may be a computing device (e.g., desktop computer, laptop computer) or mobile computing device (e.g., smartphone, tablet). The user device 120 may be configured to enable the user to access the virtual assistance system 104 via the virtual assistant client interface 122. The user device 120 may store and execute one or more instructions associated with operation of the virtual assistant client interface 122.

The one or more databases (e.g., the intent database 130, the system of records 118, the VXML application database 412) may comprise one or more computing systems/servers and/or storage systems. The one or more databases may comprise one or more electronic memory devices such as tape drives, hard disk drives, optical disks, removable storage media, solid-state memory, RAM, and the like. The intent database 130 may store a listing of intents and/or indications of associated VXML applications 116 mapped to the intents. The system of records 118 may comprise information associated with clients of the enterprise organization and may be accessed based on execution of the VXML applications 116 and/or the non-VXML applications 132. The VXML application database 412 may store the VXML applications 116 that may be fetched and executed by the media server 108 and/or the VXML interpreter 136.

In one or more arrangements, the media server 108, the virtual assistant server 124, the VXML interpreter 136, the enterprise user computing device 128, the user device 120, and/or the other systems in the computing environment 400 may be any type of computing device capable of receiving input via the user interface 120, and communicating the received input to one or more other computing devices. For example, the media server 108, the virtual assistant server 124, the VXML interpreter 136, the enterprise user computing device 128, the user device 120, and/or the other systems in the computing environment 400 may, in some instances, be and/or include server computers, desktop computers, laptop computers, tablet computers, smart phones, wearable devices, or the like that may comprised of one or more processors, memories, communication interfaces, storage devices, and/or other components. In one or more arrangements, the media server 108, the virtual assistant server 124, the VXML interpreter 136, the enterprise user computing device 128, the user device 120, and/or the other systems in the computing environment 400 may be any type of display device, audio system, wearable devices (e.g., a smart watch, fitness tracker, etc.). Any and/or all of the media server 108, the virtual assistant server 124, the VXML interpreter 136, the enterprise user computing device 128, the user device 120, and/or the other systems in the computing environment 400 may, in some instances, be special-purpose computing devices configured to perform specific functions.

Figure 4B:
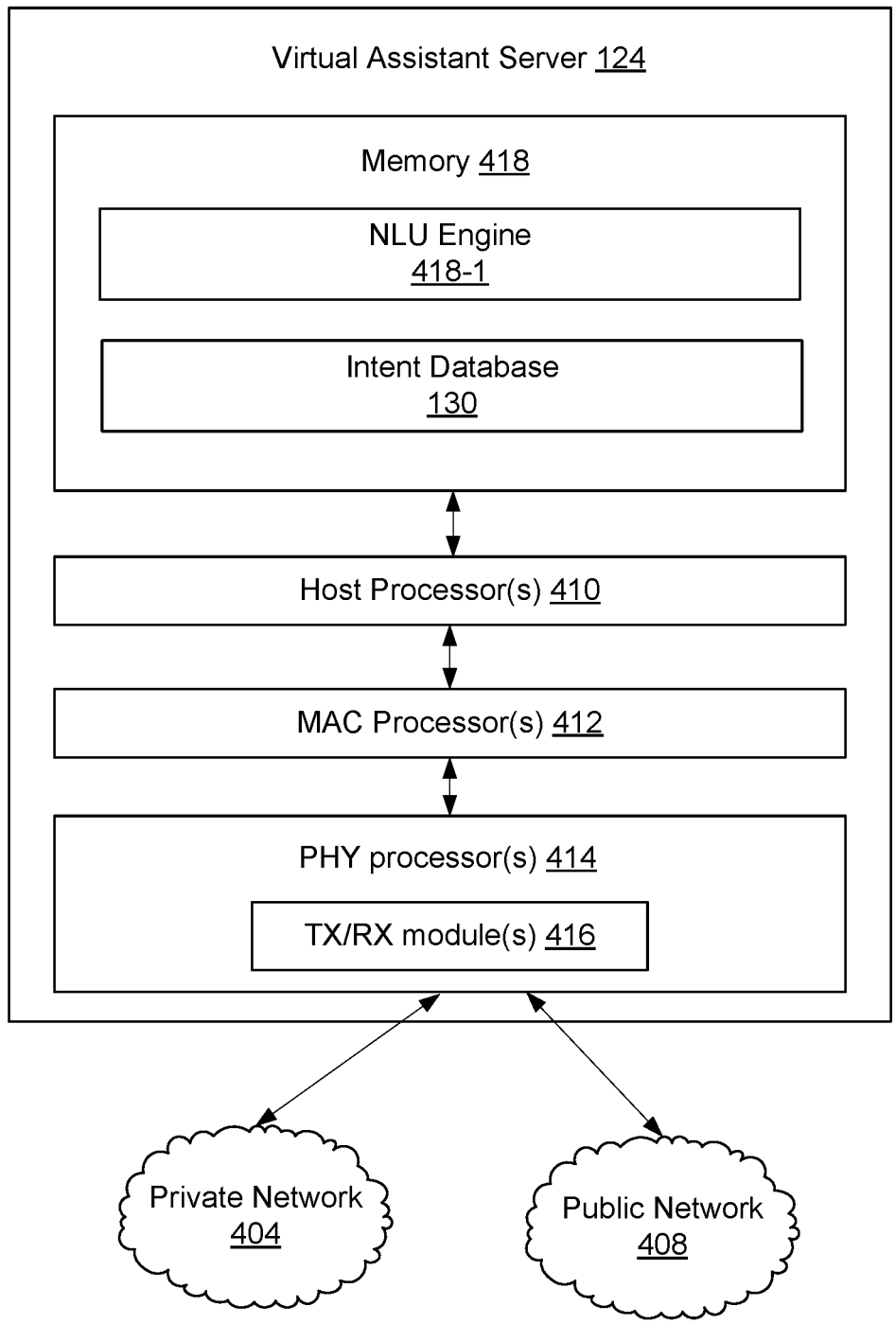
FIG. 4B shows an example virtual assistant server in accordance with one or more arrangements.

FIG. 4B shows an example virtual assistant server 124 in accordance with one or more examples described herein. The virtual assistant server 124 may comprise one or more of host processor(s) 410, medium transaction control (MAC) processor(s) 412, physical layer (PHY) processor(s) 414, transmit/receive (TX/RX) module(s) 416, memory 418, and/or the like. One or more data buses may interconnect host processor(s) 410, MAC processor(s) 412, PHY processor(s) 414, and/or Tx/Rx module(s) 416, and/or memory 418. The virtual assistant server 124 may be implemented using one or more integrated circuits (ICs), software, or a combination thereof, configured to operate as discussed below. The host processor(s) 410, the MAC processor(s) 412, and the PHY processor(s) 414 may be implemented, at least partially, on a single IC or multiple ICs. Memory 418 may be any memory such as a random-access memory (RAM), a read-only memory (ROM), a flash memory, or any other electronically readable memory, or the like.

Messages transmitted from and received at devices in the computing environment 400 may be encoded in one or more MAC data units and/or PHY data units. The MAC processor(s) 412 and/or the PHY processor(s) 414 of the virtual assistant server 105 may be configured to generate data units, and process received data units, that conform to any suitable wired and/or wireless communication protocol. For example, the MAC processor(s) 412 may be configured to implement MAC layer functions, and the PHY processor(s) 414 may be configured to implement PHY layer functions corresponding to the communication protocol. The MAC processor(s) 412 may, for example, generate MAC data units (e.g., MAC protocol data units (MPDUs)), and forward the MAC data units to the PHY processor(s) 414. The PHY processor(s) 414 may, for example, generate PHY data units (e.g., PHY protocol data units (PPDUs)) based on the MAC data units. The generated PHY data units may be transmitted via the TX/RX module(s) 416 over the communication network 404. Similarly, the PHY processor(s) 414 may receive PHY data units from the TX/RX module(s) 414, extract MAC data units encapsulated within the PHY data units, and forward the extracted MAC data units to the MAC processor(s). The MAC processor(s) 412 may then process the MAC data units as forwarded by the PHY processor(s) 414.

One or more processors (e.g., the host processor(s) 410, the MAC processor(s) 412, the PHY processor(s) 414, and/or the like) of the virtual assistant server 124 may be configured to execute machine readable instructions stored in memory 418. The memory 418 may comprise (i) one or more program modules/engines having instructions that when executed by the one or more processors cause the virtual assistant server 124 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the virtual assistant server 124 and/or by different computing devices that may form and/or otherwise make up the virtual assistant server 124. For example, the memory 418 may have, store, and/or comprise an NLU engine 418-1, and the intent database 130. The NLU engine 418-1 may have instructions that direct and/or cause the virtual assistant server 124 to perform one or more operations of the NLU component 126 as discussed herein. The intent database 130 may store indications of intents that may be serviced by the VXML applications 116. The memory 418 may have, store, and/or comprise instructions that when executed cause performance of other functions of the virtual assistance system 104 described herein. For example, the memory 418 may store instructions related to DTMF emulation for communicating with the VXML interpreter 136 (e.g., to indicate an intent/VXML application to the VXML interpreter 136). The memory 418 may store instructions that, when executed by the one or more processors, map intents as determined by the NLU component 418-1 to intents stored in the intent database 130. The memory 418 may store instructions that, when executed by the one or more processors, perform one or more functions described with reference to the VXML interpreter 136 (e.g., execute a VXML application from the VXML applications 116).

While FIG. 4A illustrates the virtual assistant server 124, the VXML interpreter 136 and/or the media server 108 as being separate elements connected in communication network 404, in one or more other arrangements, functions of one or more of the above may be integrated in a single device/network of devices. For example, elements in the virtual assistant server 124 (e.g., host processor(s) 410, memory(s) 418, MAC processor(s) 412, PHY processor(s) 414, TX/RX module(s) 416, and/or one or more program// modules stored in memory(s) 418) may share hardware and software elements with and corresponding to, for example, the VXML interpreter 136 and/or the media server 108.

Figure 5:
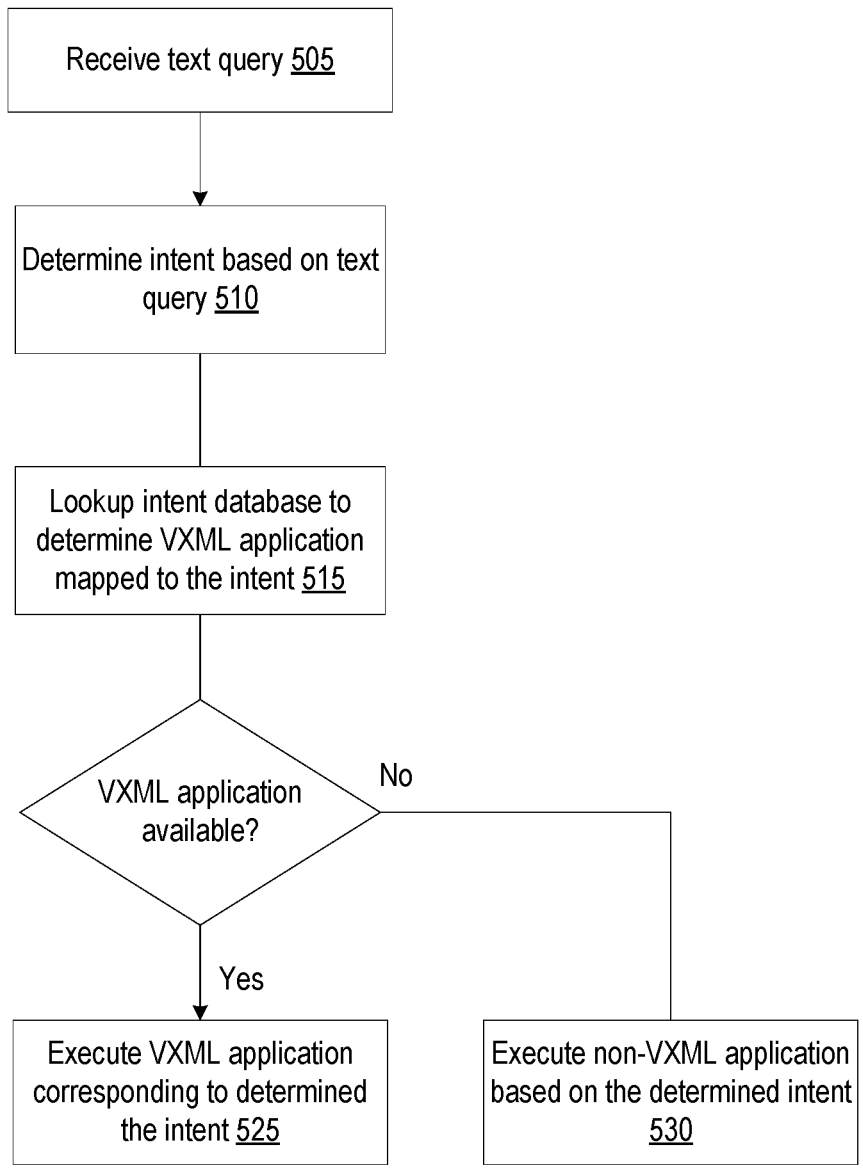
FIG. 5 shows an example algorithm for servicing text queries in a virtual assistance system, in accordance with one or more example arrangements.

FIG. 5 shows an example algorithm 500 for servicing text queries in a virtual assistance system (e.g., the virtual assistance system 104), in accordance with one or more example arrangements. The example algorithm 500 may be used, for example, to service user text queries input via the virtual assistant client interface 122 at the user device 120. The example algorithm may be performed at the virtual assistant server 124 in the virtual assistance system 104 and/or at the VXML interpreter 136.

At step 505, the virtual assistant server 124 may receive, from the user device 120, a message indicating a text query (e.g., as input by the user via the virtual assistant client interface 122). At step 510, the virtual assistant server 124 may determine an intent based on the received text query. Determining the intent may comprise using the NLU component 126 to categorize the intent to a specific purpose that may be serviced by various customer assistance applications (e.g., VXML applications, non-VXML applications).

At step 515, the virtual assistant server 124 may look-up the intent database 130 to determine if the intent is associated with a VXML application among the VXML applications 116. The intent database 130 may comprise a listing of intents and corresponding VXML applications 116 associated with the listed intents. For example, if the VXML applications 116 comprise application 116-1 for checking a user account balance, the VXML application 116-2 for providing credit card-related information, the VXML application 116-3 for initiating a money transfer, and the VXML application 116-4 for checking a transaction history, the listed intents may be "account balance," "credit card," "money transfer," and "transaction history." Indications of the VXML applications 116-1 . . . 116-4 may be mapped to the listed intents in the intent database 130.

At step 525, if the intent database 130 indicates a VXML application associated with the determined intent, the VXML application server 124 (and/or the VXML interpreter 136) may execute the indicated VXML application. Executing the VXML application may comprise one or more of: requesting additional user input via the virtual assistant client interface 122, sending one or more messages corresponding to text output for display at the virtual assistant client interface 122, retrieving information from the system of records 118, sending one or more messages corresponding to the retrieved information, etc.

At step 530, if the intent database 130 does not indicate a VXML application associated with the determined intent, the VXML application server 124 (and/or the VXML interpreter 136) may execute a non-VXML application corresponding to the determined intent. Executing the non-VXML application may comprise one or more of: requesting additional user input via the virtual assistant client interface 122, sending one or more messages corresponding to text output for display at the virtual assistant client interface 122, retrieving information from the system of records 118, sending one or more messages corresponding to the retrieved information, etc.

Using VXML applications as described herein for servicing text-based requests (from a chatbot, a virtual assistant interface, etc.) may enable an enterprise organization to efficiently provide customer service without expending additional resources for developing new applications (e.g., for the chatbot, the virtual assistant interface). The VXML applications may be re-used, by a virtual assistant server, for processing text-based user requests via a novel interface between a VXML application database and the virtual assistant server.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A virtual assistance server comprising:
at least one processor;
a communication interface communicatively coupled to the at least one processor; and memory storing computer-readable instructions that, when executed by the at least one processor, configure the virtual assistance server to:

receive, from a user communication device via the communication interface, one or more first messages comprising text input;

check whether the text input is associated with any voice extensible markup language (VXML) application among a plurality of VXML applications corresponding to a voice-based assistance system;

determine, based on the text input not being associated with any VXML application among the plurality of VXML applications, a text output, wherein the determining the text output comprises using a non-VXML application; and send, to the user communication device, one or more second messages comprising the text output for display at the user communication device.

2. The virtual assistance server of claim 1, wherein the using the non-VXML application comprises executing, based on the text input, the non-VXML application to determine the text output.

3. The virtual assistance server of claim 1, wherein the using the non-VXML application comprises one or more of:

sending, to the user communication device, a message requesting additional text input at the user communication device;

retrieving information from a system of records; or sending, to the user communication device, retrieved information from the system of records.

4. The virtual assistance server of claim 1, wherein the computer-readable instructions, when executed by the at least one processor, cause the virtual assistance server to:

determine, using a natural language understanding (NLU) component and based on the text input, an intent associated with the text input;

wherein the checking whether the text input is associated with any VXML application, among the plurality of VXML applications, comprises determining whether any VXML application, among the plurality of VXML applications, is mapped to the intent.

5. The virtual assistance server of claim 4, wherein the text input not being associated with any VXML application among the plurality of VXML applications comprises that no VXML application is mapped to the intent.

6. The virtual assistance server of claim 4, wherein the text input being associated with a VXML application among the plurality of VXML applications comprises that the VXML application is mapped to the intent.

7. The virtual assistance server of claim 4, wherein the using the non-VXML application is further based on determining that the non-VXML application is mapped to the intent.

8. The virtual assistance server of claim 4, wherein the determining whether any VXML application, among the plurality of VXML applications, is mapped to the intent comprises looking up an intent database, wherein the intent database comprises a plurality of intents mapped to the plurality of VXML applications.

9. The virtual assistance server of claim 1, wherein the computer-readable instructions, when executed by the at least one processor, cause the virtual assistance server to:

receive, from the user communication device via the communication interface, one or more second messages comprising a second text input;

check whether the second text input is associated with any VXML application among the plurality of VXML applications corresponding to the voice-based assistance system;

determine, based on the second text input being associated with a VXML application, a second text output, wherein the determining the second text output comprises using the VXML application, and wherein the using the VXML application comprises:

sending, to a VXML interpreter, an indication of the VXML application; and receiving, from the VXML interpreter, one or more third messages comprising the text output.

10. A method comprising:

receiving, by a virtual assistance server and from a user communication device, one or more first messages comprising a text input, from a user, at the user communication device;

checking whether the text input is associated with any voice extensible markup language (VXML) application among a plurality of VXML applications corresponding to a voice-based assistance system;

determining, based on the text input not associated with any VXML application among the plurality of VXML applications, a text output, wherein the determining the text output comprises using a non-VXML application; and sending, to the user communication device, one or more second messages comprising the text output for display at the user communication device.

11. The method of claim 10, wherein the using the non-VXML application comprises executing, based on the text input, the non-VXML application to determine the text output.

12. The method of claim 10, wherein the using the non-VXML application comprises one or more of:

sending, to the user communication device, a message requesting additional text input at the user communication device;

retrieving information from a system of records; or sending, to the user communication device, retrieved information from the system of records.

13. The method of claim 10, further comprising:

determining, using a natural language understanding (NLU) component and based on the text input, an intent associated with the text input;

wherein the checking whether the text input is associated with any VXML application, among the plurality of VXML applications, comprises determining whether any VXML application, among the plurality of VXML applications, is mapped to the intent.

14. The method of claim 13, wherein the text input not being associated with any VXML application among the plurality of VXML applications comprises that no VXML application is mapped to the intent.

15. The method of claim 13, wherein the text input being associated with a VXML application among the plurality of VXML applications comprises that the VXML application is mapped to the intent.

16. The method of claim 13, wherein the using the non-VXML application is further based on determining that the non-VXML application is mapped to the intent.

17. The method of claim 13, wherein the determining whether any VXML application, among the plurality of VXML applications, is mapped to the intent comprises looking up an intent database, wherein the intent database comprises a plurality of intents mapped to the plurality of VXML applications.

18. The method of claim 10, further comprising:
receiving, from the user communication device, one or more second messages comprising a second text input;
checking whether the second text input is associated with any VXML application among the plurality of VXML applications corresponding to the voice-based assistance system;
determining, based on the second text input being associated with a VXML application, a second text output, wherein the determining the second text output comprises using the VXML application, and wherein the using the VXML application comprises:
sending, to a VXML interpreter, an indication of the VXML application; and
receiving, from the VXML interpreter, one or more third messages comprising the text output.

19. A non-transitory computer readable medium storing computer executable instructions that, when executed by a processor, cause a virtual assistance server to:
receive, from a user communication device, one or more first messages comprising a text input, from a user, at the user communication device;
check whether the text input is associated with any voice extensible markup language (VXML) application among a plurality of VXML applications corresponding to a voice-based assistance system;
determine, based on the text input not being associated with any VXML application among the plurality of VXML applications, a text output, wherein the determining the text output comprises
using a non-VXML application; and
send, to the user communication device, one or more second messages comprising the text output for display at the user communication device.

20. The non-transitory computer readable medium of claim 19, wherein the instructions, when executed by the processor, further cause the virtual assistance server to:
determine, using a natural language understanding (NLU) component and based on the text input, an intent associated with the text input;
wherein the checking whether the text input is associated with any VXML application, among the plurality of VXML applications, comprises determining whether any VXML application, among the plurality of VXML applications, is mapped to the intent.

* * * * *